United States Patent
Bowman-Shaw

[11] 3,822,804
[45] July 9, 1974

[54] SIDE LOADERS
[75] Inventor: George Neville Bowman-Shaw, Toddington, England
[73] Assignee: Lancer Boss Limited, Bedfordshire, England
[22] Filed: May 21, 1973
[21] Appl. No.: 362,547

Related U.S. Application Data
[63] Continuation of Ser. No. 111,588, Feb. 1, 1971, abandoned.

[52] U.S. Cl............................... 214/670, 214/75 G
[51] Int. Cl.............................................. B66f 9/10
[58] Field of Search......... 214/75 G, 15 R, 16.1 EB, 214/660, 670, 730, 16.4 A; 187/7, 9

[56] References Cited
UNITED STATES PATENTS
| | | | |
|---|---|---|---|
| 2,984,367 | 5/1961 | McIntyre | 214/15 R |
| 3,067,839 | 12/1962 | Gibson | 214/670 |
| 3,232,455 | 2/1966 | Fountain et al. | 214/16.4 A |
| 3,595,409 | 7/1971 | Bowman-Shaw | 214/670 |

Primary Examiner—Albert J. Makay
Assistant Examiner—Lawrence J. Oresky
Attorney, Agent, or Firm—Snyder, Brown and Ramik

[57] ABSTRACT

For a side loader vehicle having a transverse recess between front and rear body portions with mast guides adjacent to the recess, a mast traversing mechanism comprising at each side of the recess a mast-trolley moving along the guide, a shaft journalled in the mast-trolley assembly and extending across the mast, a first sprocket fast with the shaft, a second sprocket rotatably mounted on each side of the mast in alignment with the first sprocket, a chain anchored at its extremities to the vehicle chassis and passing over one sprocket and under the other sprocket, a tensioning device to tension the chain round the sprockets, and a prime mover drivingly connected to the shaft to cause the mast to travel along the recess.

5 Claims, 2 Drawing Figures

PATENTED JUL 9 1974 3,822,804

Inventor
GEORGE NEVILLE NEWMAN-SHAW

By

Attorney

SIDE LOADERS

CROSS-REFERENCE TO RELATED APPLICATIONS

This application is a continuation of U.S. Pat. application No. 111,588 filed Feb. 1, 1971, now abandoned.

BACKGROUND OF THE INVENTION

1. Field of the Invention

This invention relates to load carrying vehicles which are loaded from one side by means of a fork-lift or similar device mounted on a mast which may upstand on and be traversed on a trolley from an inoperative position within the vehicle frame to an operative position on one side of the vehicle, such vehicles commonly being known as side loaders.

Side loaders have front and rear body portions each of which are mounted on road wheels and which at one side of the vehicle carry a backbone unit which combines the two parts of the vehicle together leaving a recess across the vehicle. The driver's cab is mounted on the back or the front over the backbone and the prime mover of the vehicle is mounted on the front or back again over the backbone. The mast is traversed by the trolley or like guiding means running in horizontal guides along the front and back wall of the recess and extending throughout the full depth of the recess. The load is held on fork arms extending horizontally from a carriage on the mast so that there is a gravitational force to turn the mast downwards which demands equal loading of the sides of the trolley to avoid overloading of one side of the trolley which results in the mast tending to waddle out of the recess.

2. Description of Prior Art

In known constructions the mast is moved by means of a chain the ends of which are fixed to the mast and which passes round rollers on either side of the vehicle one of which is driven by a prime mover. In some cases the prime mover is itself driven by a hydraulic ram through a chain mechanism which rotates the shaft.

The main object of the present invention is to provide an improved mast traversing means which is simpler than the known constructions, inexpensive to manufacture using a minimum amount of materials, is robust in construction, and minimises the aforesaid disadvantages.

SUMMARY

According to the present invention a traversing mechanism for the mast of a side loader vehicle moveable across a recess in the vehicle comprises a shaft journalled to and extending across the mast, a sprocket fast on the shaft at each side of the mast, a second sprocket rotatably mounted on each side of the mast in alignment with the first sprocket, a chain or the like anchored at both ends to the opposite sides of the vehicle chassis and passing over one sprocket and under the other sprocket, a tensioning device to place the chain in tension round the sprocket, and a prime mover to rotate the shaft and at least one pair of sprockets to cause the mast to travel across the vehicle.

In a preferred construction the mast is carried at each side of the recess on a trolley moveable in a guide along the recess, the shaft being journalled on the mast or on the trolley. The prime mover may comprise an hydraulic motor mounted on the trolley or mast and operatively connected to the shaft.

The sprockets at each side of the mast are preferably in the same plane normal to their axes of rotation and spaced one from the other to provide a chain path between them at about 120° to the straight portions of the chain between the sprockets and their anchors.

DESCRIPTION OF PREFERRED EMBODIMENT

Figure 1:
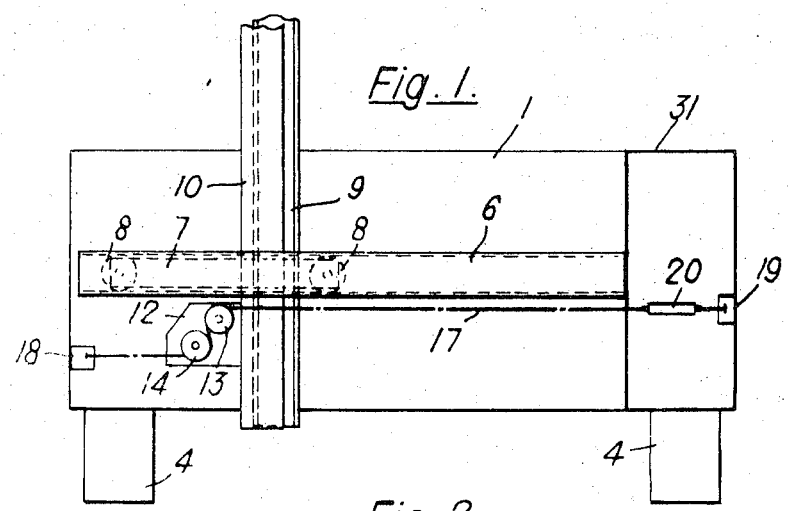
FIG. 1 is a diagrammatic view looking endwise of the vehicle showing the mast and its method of traversing across the vehicle and, FIG. 2 is a plan view of the vehicle in outline.
Figure 2:
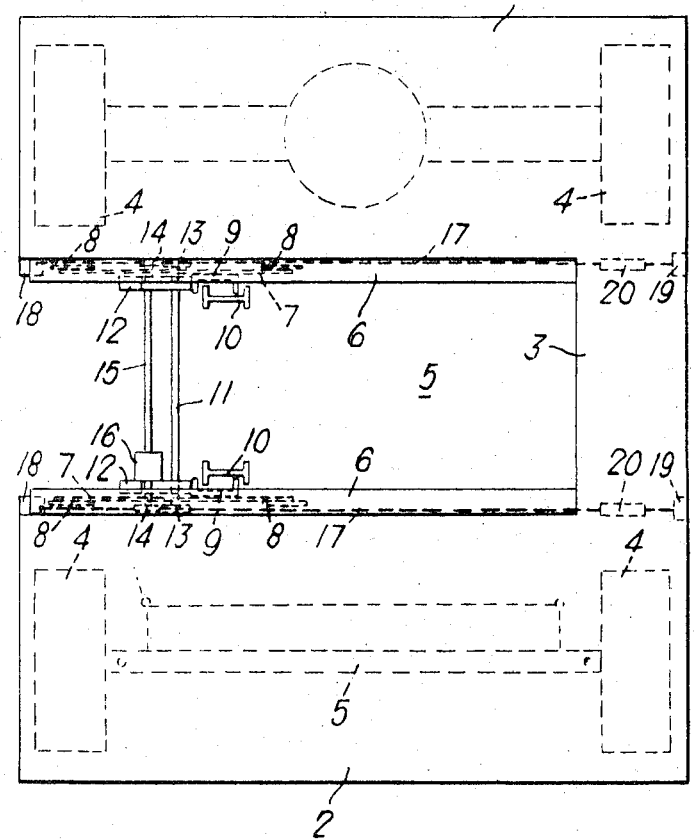

Referring to the drawings the side loader vehicle comprises one end body portion 1 and a second end body portion 2 which are joined together by a rigid backbone 3, each of the parts 1 and 2 being mounted on road wheels 4, those on the parts 2 being indicated as having a steering mechanism 5 but of course they will be on the other part 1 that is the steerable end of the vehicle. Between the parts 1 and 2 and extending from the backbone 3 sideways to the other side of the vehicle is a recess 5 and along the sides of the recess guides 6 are mounted of generally U-shape with their open faces directed across the recess. In each guide 6 a trolley 7 running on wheels 8 is mounted and to these trolleys are fixed the parts 9 of the mast and sliding within those in the conventional manner are parts of the mast 10 which as the lifting mechanism is operated rise in the fixed mast parts 9.

Beneath each of the guides 6 is mounted a shaft 11 which extends across the vehicle and is journalled in brackets 12 fast on the mast. Each end of the shaft 11 has a sprocket 13 and a second sprocket 14 is journalled on the bracket 12 and interconnected with the sprocket 14 at the other side of the mast by a shaft 15. On the shaft 15 or connected drivingly therewith is a prime mover 16 which is preferably an hydraulic motor of the rotary type but any other prime mover may be employed. Indeed a flexible drive to the shaft 11 or 15 may be taken from the engine of the vehicle. A chain 17 is anchored at 18 to one side of the vehicle and at 19 to the other side of the vehicle and has a number 20 of conventional construction which can be adjusted to tighten or loosen the chains. Between the anchors 18 and 19 the chain passes under the sprocket 14 and over the sprocket 13, the section of the chain between the two sprockets being at a suitable angle e.g., 120° to the horizontal parts of the chain 17 thus ensuring a good grip of the chain on the two sets of sprockets.

On rotation of the shaft 15 or the shaft 11 by the prime mover the sprockets will ride along the chain and move the mast along the recess in the vehicle.

The controls for the prime mover 16 are preferably in the cab of the vehicle disposed usually above the part 2 which has the steering mechanism.

It will be seen that by means of the construction of the invention a very simple chain drive is provided which has few moving parts and a small number of parts for its construction.

I claim:

1. In combination with a side loader vehicle having a chassis including front and rear body portions defining a transverse recess therebetween horizontal guide means on said front and rear body portions at each side of said recess, and a load-supporting assembly supported for transverse movement along said guide means within said recess, said load-supporting assembly comprising two carriages one at each side of said recess and each engaging a respective guide means and a vertical load-supporting mast assembly rigidly connected adjacent its lower end to said carriages, a mechanism for traversing said load-supporting assembly along said guide means, said mechanism comprising a shaft journalled to and extending transversely of said load-supporting assembly adjacent the lower end of said mast assembly, a first sprocket fast on said shaft at each side of said load-supporting assembly, a second and last sprocket rotatably mounted on each side of said load-supporting assembly in alignment with each said first sprocket, two chains one at each side of said load-supporting assembly and each chain anchored at both its end portions to opposite sides of the chassis of said vehicle, each said chain passing over one of said sprockets and under the other of said sprockets to define straight chain portions between the anchored end portions of the chains and said sprockets, said first and second sprockets at each side of said recess being in the same plane and being spaced from each other to provide a chain path between them at about 120° to the straight portions of said chain extending between said sprockets and said anchored end portions thereof, a tensioning device to place each said chain in tension round said first and second sprockets, and prime mover means for driving at least one of said first and second sprockets simultaneously to rotate said shaft and all of said sprockets to cause said mast to travel along said recess without binding or waddling.

2. In combination with a side loader vehicle according to claim 1 wherein each said carriage is a trolley and said shaft is journalled on said mast assembly.

3. In combination with a side loader vehicle according to claim 1 wherein each said carriage is a trolley and said shaft is journalled in said trolleys.

4. In combination with a side loader vehicle according to claim 1 wherein said prime mover means comprises an hydraulic motor mounted on the load-supporting assembly and is drivingly connected to said shaft.

5. In combination with a side loader vehicle according to claim 1 wherein said sprockets and said chains are mounted below the said carriages.

* * * * *